(12) United States Patent
Kato et al.

(10) Patent No.: US 7,995,903 B2
(45) Date of Patent: Aug. 9, 2011

(54) DATA RECORDING AND REPRODUCING APPARATUS AND DATA RECORDING AND REPRODUCING METHOD

(75) Inventors: Toshihiro Kato, Tokyo (JP); Akinobu Watanabe, Yokohama (JP); Hiroyasu Otsubo, Yokohama (JP); Hiromi Nishiura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1181 days.

(21) Appl. No.: 11/717,789

(22) Filed: Mar. 14, 2007

(65) Prior Publication Data

US 2008/0019666 A1   Jan. 24, 2008

(30) Foreign Application Priority Data

Jul. 18, 2006   (JP) ................. 2006-195351

(51) Int. Cl.
*H04N 5/917* (2006.01)
(52) U.S. Cl. ........ 386/328; 386/332; 386/335; 386/336; 386/355; 725/50
(58) Field of Classification Search .......... 369/84, 369/85; 725/39, 46, 50, 58; 386/239, 259, 386/278, 279, 286, 288, 291, 294, 295, 326–336, 386/353–356; 370/487
See application file for complete search history.

(56) References Cited

U.S. PATENT DOCUMENTS

| | | | | |
|---|---|---|---|---|
| 7,849,485 B2 * | 12/2010 | Paik et al. | ......... | 725/62 |
| 2002/0040475 A1 * | 4/2002 | Yap et al. | ......... | 725/39 |
| 2004/0158861 A1 * | 8/2004 | Terakado et al. | ......... | 725/52 |
| 2005/0015805 A1 * | 1/2005 | Iwamura | ......... | 725/79 |
| 2007/0263514 A1 * | 11/2007 | Iwata et al. | ......... | 369/84 |
| 2008/0025690 A1 | 1/2008 | Kondo et al. | | |

FOREIGN PATENT DOCUMENTS

| | | |
|---|---|---|
| JP | 06-133235 | 5/1994 |
| JP | 2000-123365 | 4/2000 |
| JP | 2000-322291 | 11/2000 |
| JP | 2001-094935 | 4/2001 |
| JP | 2001-110125 | 4/2001 |

(Continued)

OTHER PUBLICATIONS

Japanese Office Action issued in Japanese Patent Application No. 2006-195351, mailed Jan. 5, 2010.

(Continued)

*Primary Examiner* — Thai Tran
*Assistant Examiner* — Mishawn Dunn
(74) *Attorney, Agent, or Firm* — McDermott Will & Emery LLP

(57) ABSTRACT

A recording and reproducing module records a signal (broadcast program) based on a first compression method to a recording medium, and during a period of time during which recording is not performed, reproduces the signal based on the first compression method, which has been recorded to the recording medium. Then, a transcoding module transcodes the signal based on the first compression method to a signal based on a second compression method. The signal based on the second compression method, whose transcoding has been completed, is recorded to the recording medium; and the signal based on the first compression method is erased from the recording medium. The controller refers to recording history information and sets a schedule including a target broadcast program to be transcoded and a time zone in which the target broadcast program is transcoded.

4 Claims, 13 Drawing Sheets

FOREIGN PATENT DOCUMENTS

| | | |
|---|---|---|
| JP | 2001-357612 | 12/2001 |
| JP | 2002-290903 | 10/2002 |
| JP | 2003-199050 | 7/2003 |
| JP | 2003-235009 | 8/2003 |
| JP | 2003-274356 | 9/2003 |
| JP | 2004-040335 | 2/2004 |
| JP | 2005-64997 | 3/2005 |
| JP | 2005-71572 | 3/2005 |
| JP | 2005-235333 | 9/2005 |
| JP | 2005-295039 | 10/2005 |
| JP | 2006-12225 | 1/2006 |
| JP | 2006-173941 | 6/2006 |
| WO | WO 2006/033224 A1 | 3/2006 |

OTHER PUBLICATIONS

Japanese Office Action issued in Japanese Patent Application No. JP 2006-195351 dated Mar. 30, 2010.

Chinese Office Action, with English translation, issued in Chinese Patent Application No. 200710091705.9, dated May 22, 2009.

* cited by examiner

FIG.4A

LIST OF BROADCAST PROGRAMS
WHOSE RECORDING IS PROGRAMMED

| | | | | H.264 TRANSCODING | PRIORITY |
|---|---|---|---|---|---|
| No.1 | "The North Pole Story" | HD(MPEG2) | 125min. | TO BE TRANSCODED | LOW |
| No.2 | "Go To tomorrow" | HD(MPEG2) | 30min. | TO BE TRANSCODED | HIGH |
| No.3 | "New Year's Eve song show" | HD(MPEG2) | 235min. | TO BE TRANSCODED | LOW |
| No.4 | "News 1" | HD(MPEG2) | 10min. | NOT TO BE TRANSCODED | — |
| No.5 | "24-hour TV" | HD(MPEG2) | 1450min. | TO BE TRANSCODED | LOW |

FIG.4B

LIST OF BROADCAST PROGRAMS THAT ARE WAITING
FOR TRANSCODING (IN ORDER OF DECREASING PRIORITY)

| No.2 | "Go To tomorrow" | HD(MPEG2) | 30min. |
|---|---|---|---|
| No.1 | "The North Pole Story" | HD(MPEG2) | 125min. |
| No.3 | "New Year's Eve song show" | HD(MPEG2) | 235min. |
| No.5 | "24-hour TV" | HD(MPEG2) | 1450min. |

FIG.4C

UNUSED TIME LIST

5/10 10:00 - 5/10 11:00 (60min.)
5/10 12:00 - 5/10 16:00 (240min.)
5/10 16:30 - 5/13 16:00 (1410min.)
5/13 19:00 - (∞)

FIG.4D

LIST OF TRANSCODING SCHEDULES

| 5/10 10:00 - 5/10 10:30 | (30min.) | No.2 | "Go To tomorrow" | HD(MPEG2) | 30min. |
|---|---|---|---|---|---|
| 5/10 12:00 - 5/10 14:05 | (125min.) | No.1 | "The North Pole Story" | HD(MPEG2) | 125min. |
| 5/10 16:30 - 5/10 20:45 | (255min.) | No.3 | "New Year's Eve song show" | HD(MPEG2) | 235min. |
| 5/13 19:00 - 5/14 19:10 | (1410min.) | No.5 | "24-hour TV" | HD(MPEG2) | 1450min. |

FIG.5A

PROGRAMMED TRANSCODING
SETTING SCREEN

| TIME | 9 | 10 | 11 | 12 | 13 | 14 | 15 |
|------|---|----|----|----|----|----|----|
| RECORDING 1 | ⇔BROADCAST PROGRAM_1⇔ | | | | | | |
| RECORDING 2 | | ⇔BROADCAST PROGRAM_2⇔ | | | | | |
| TRANSCODING | | | | BROADCAST PROGRAM_1 | ⇔BROADCAST PROGRAM_3⇔ | | BROADCAST PROGRAM_3 |

FIG.5B

WARNING !

RECORDING IS SCHEDULED TO START DURING TRANSCODING. DO YOU GIVE HIGHER PRIORITY TO THE TRANSCODING ?

⇒ Yes (GIVE HIGHER PRIORITY TO TRANSCODING)
   No (GIVE HIGHER PRIORITY TO RECORDING)

FIG.5C

WARNING !

RECORDING IS SCHEDULED TO START DURING TRANSCODING. THE TRANSCODING WILL BE INTERRUPTED TO SWITCH THE RECORDING.

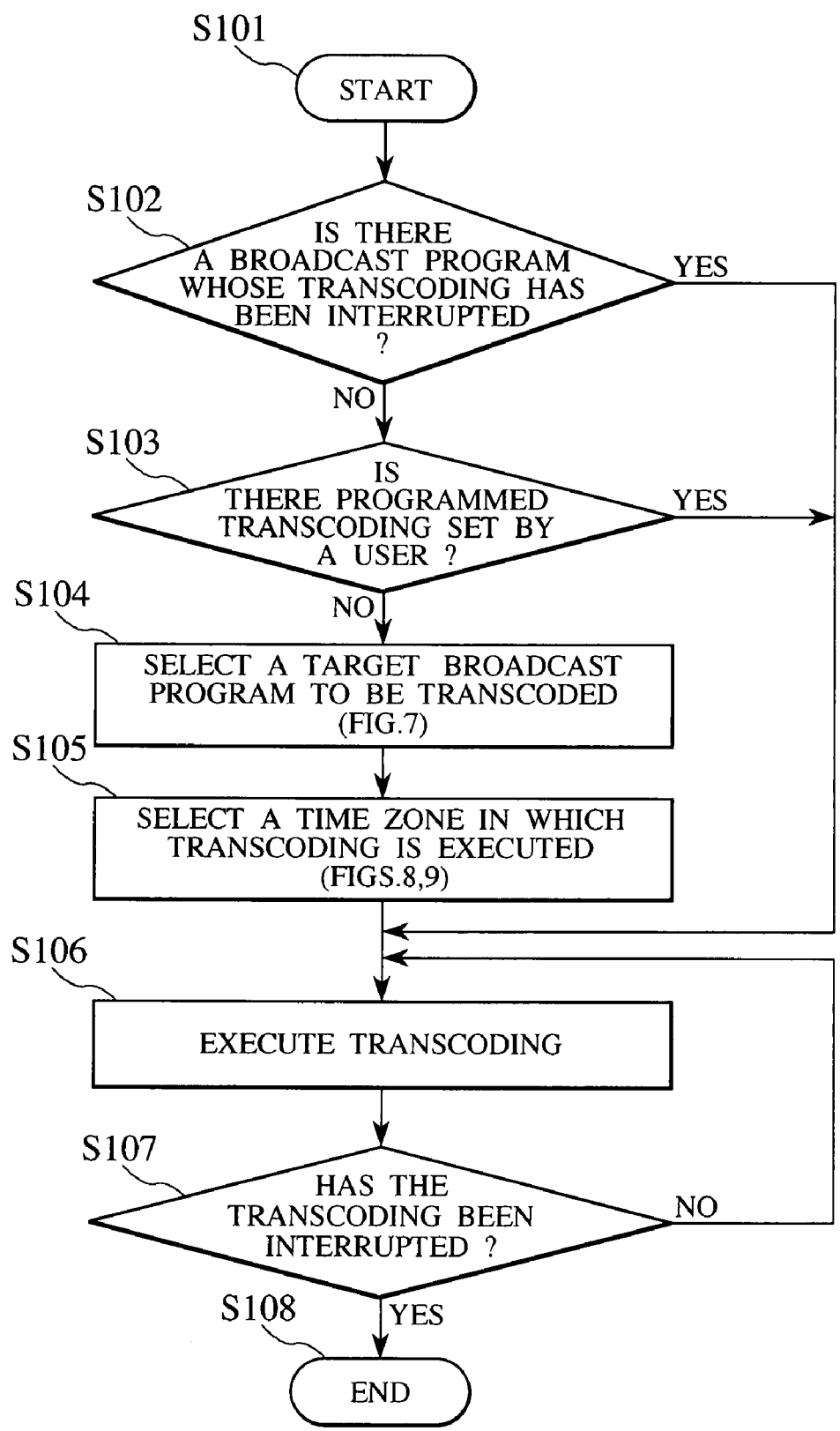

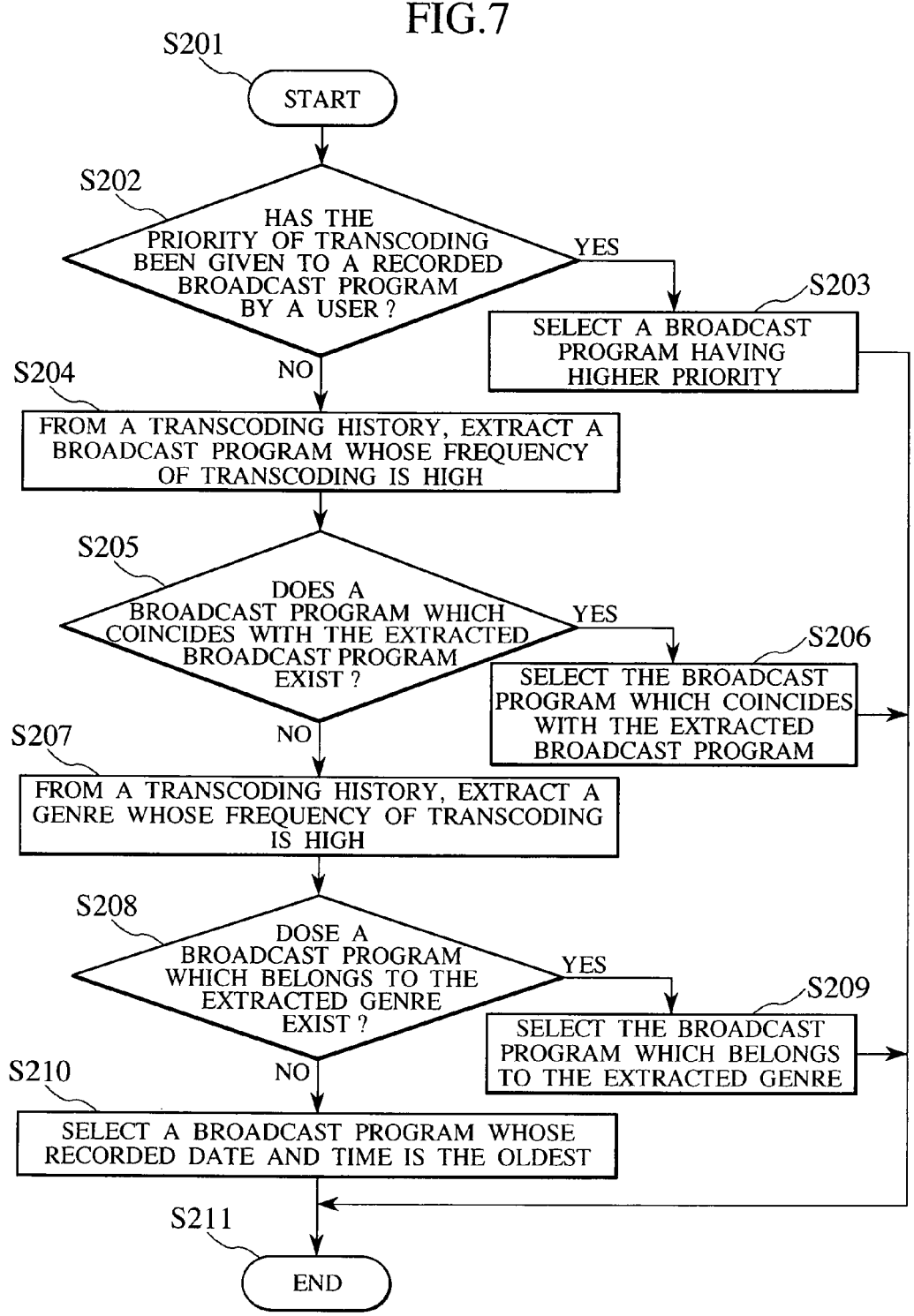

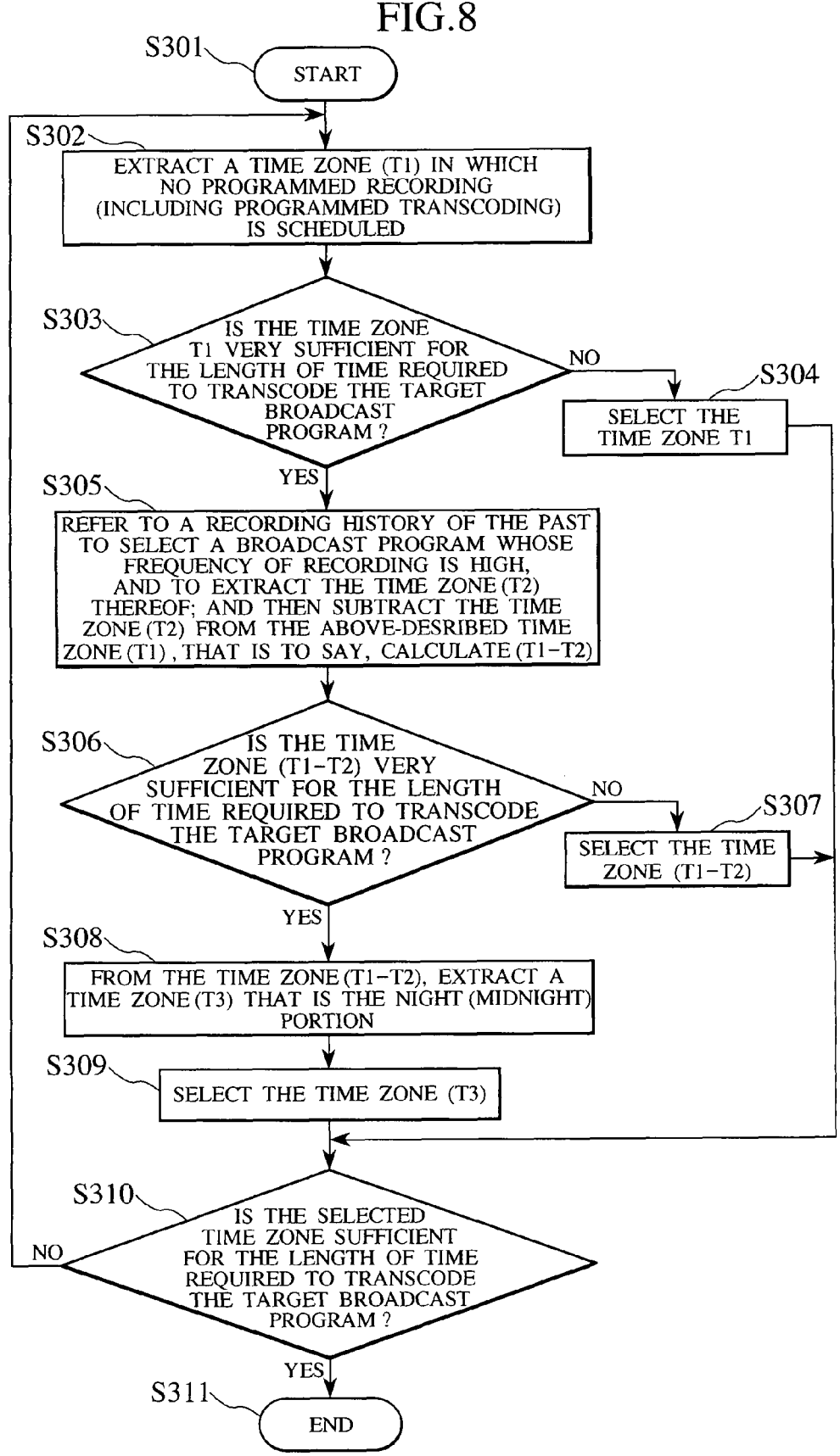

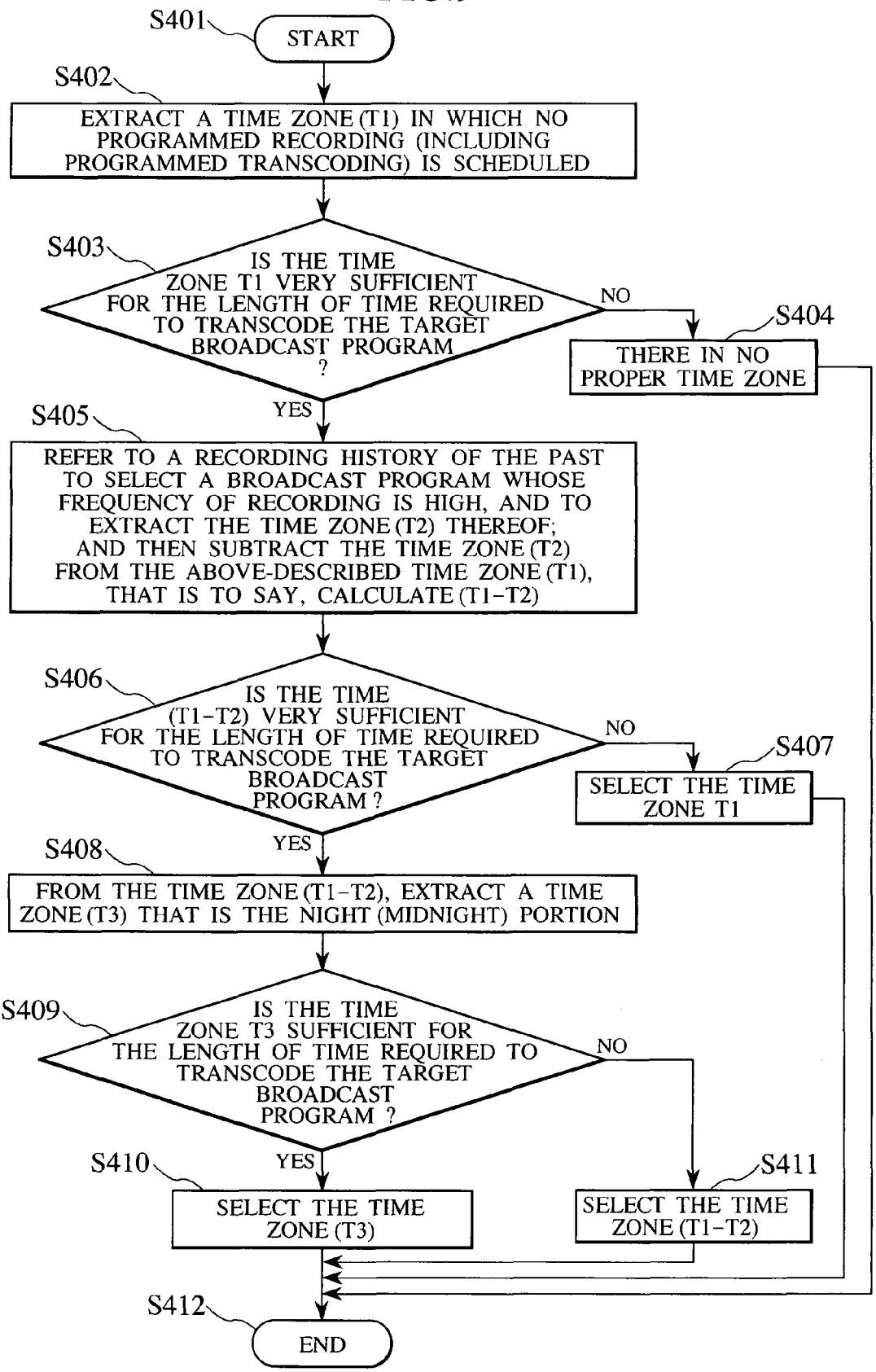

DATA RECORDING AND REPRODUCING APPARATUS AND DATA RECORDING AND REPRODUCING METHOD

CLAIM OF PRIORITY

The present invention claims priority from Japanese Application serial no. JP2006-195351, files on Jul. 18, 2006, the contents of which is hereby incorporated by reference into this application.

BACKGROUND OF THE INVENTION (1) Field of the Invention

The present invention relates to a data recording and reproducing apparatus which encodes video and audio signals to record and reproduce the signals to and from a recording medium.

(2) Description of the Related Art

When a digital broadcast signal is recorded to a hard disk and an optical disc recording medium, the digital broadcast signal is usually recorded in a format that is in conformity with the broadcast standards. For example, for the recording of video and audio signals, which uses a BD (Blu-ray Disc) medium known as a large-capacity optical disc, standards which are called the BDAV (BD Audio/Visual) format have been established. When this format is used, a received digital broadcast is recorded to a BD medium based on a certain compression format (encoding format) without changing the compression format (encoding format). To be more specific, a video signal is received by the MPEG2 format, and the video signal is then recorded to a BD medium without changing the format.

On the other hand, for BD media, standards used for read-only media, which are called the BDMV (BD MoVie) format, have been established. Because this format adopts the H.264 method whose compression ratio is higher than that of the MPEG2 format, a video signal is recorded with higher efficiency. Therefore, if a received video signal based on the MPEG2 format is transcoded to a signal based on the H.264 format whose compression ratio is high before the transcoded signal is recorded to a medium, it is possible to save the capacity of the medium, and thereby to improve the efficiency in the use.

However, if a digital broadcast signal is transcoded to that based on a high compression format in real time with the digital broadcast signal being received, a high-performance encoder (transcoder) is required. In particular, because a high-definition (HD) broadcast signal contains the huge amount of information, it is not easy to satisfactorily transcode this signal. For this reason, if the digital broadcast signal is transcoded not in real-time but in delayed time using an unused time of a data recording and reproducing apparatus, a load on the encoder (transcoder) is reduced, and consequently the feasibility is increased.

For example, Japanese Patent Application Laid-Open No. 2001-110125 proposes a technique for changing a compression format without increasing product costs, and with data (video/audio data) being transferred at a normal speed. Here, compressed data which is inputted at a transfer rate exceeding the normal speed is recorded to a medium without changing the compression format. After that, using an unused time for an access to the medium, the compressed data is reproduced from the medium to transcode the data, at the normal speed, to data based on a different compression format, and then the transcoded data is recorded to the medium again.

SUMMARY OF THE INVENTION

According to the above technique disclosed in the Japanese Patent Application Laid-Open No. 2001-110125, it is possible to handle video/audio data whose transfer rate exceeds double speed by use of a normal-speed transcoder. Since video/audio data which is not transcoded by the transcoder is stored in the medium just as it is, however, the remaining capacity of the medium decreases. This means that the amount of data which can be newly recorded decreases. In addition, from the standpoint of users, it is desirable that the transcoding processing be automatically executed as background processing without user's particular consciousness of the transcoding processing. In particular, if the number of desired broadcast programs to be transcoded increases, and if the unused time during which transcoding can be executed is limited, it is a troublesome task for users to set transcoding schedules by themselves. Moreover, if a setting error occurs, transcoding processing will fail, and there is also a possibility that an original state will not be able to be recovered. Furthermore, because user's taste differs, it is desirable to perform scheduling in which each user's taste is reflected. The above technique for performing transcoding processing, which is disclosed in Japanese Patent Application Laid-Open No. 2001-110125, does not take the user's usability into consideration.

An object of the present invention is to provide a data recording and reproducing apparatus capable of satisfactorily performing transcoding processing so as to suit user's taste.

According to one aspect of the present invention, there is provided a data recording and reproducing apparatus comprising: a recording and reproducing module which records a compressed video or audio signal to a recording medium, and which reproduces the video or audio signal from the recording medium; and a transcoding module which transcodes a first video or audio signal, which has been compressed based on a first compression method, to a second video or audio signal that is compressed based on a second compression method. The recording and reproducing module records the first video or audio signal to the recording medium. During a period of time during which data is not recorded to the recording medium, the recording and reproducing module reproduces the first video or audio signal recorded to the recording medium. The transcoding module transcodes the first video or audio signal to produce the second video or audio signal. The recording and reproducing module records, to the recording medium, the second video or audio signal acquired as a result of the transcoding; and erases, from the recording medium, the first video or audio signal that is not transcoded.

Here, the transcoding module transcodes the first video or audio signal with a specified length being used as a unit. The recording and reproducing module erases, from the recording medium, the first video or audio signal that have been transcoded so that a coexisting period of time during which the first video or audio signal which is not transcoded and the second video or audio signal acquired as a result of the transcoding coexist does not exceed a specified length of time.

The data recording and reproducing apparatus further comprises:

a tuner for receiving a digital broadcast signal;

a control module which controls: recording of a broadcast program specified by a user to the recording medium from a digital broadcast signal received by the tuner; and transcoding of the recorded broadcast signal to a signal compressed based on a different compression method by use of the transcoding module; and a memory for storing a recording history information about at least a recorded broadcast program and a broadcast program for which recording is scheduled, wherein:

the control module executes the steps of:

referring to the recording history information stored in the memory to select a recorded broadcast program, and a time zone in which recording is not scheduled;

setting a schedule including a target broadcast program to be transcoded by the transcoding module, and a time zone in which the target broadcast program is transcoded, and instructing the transcoding module to change a compression method of the target broadcast program according to the schedule.

BRIEF DESCRIPTION OF THE DRAWINGS

These and other features, objects and advantages of the present invention will become more apparent from the following description when taken in conjunction with the accompanying drawings wherein:

FIGS. 4A through 4D are lists each illustrating an example in which each transcoding schedule is determined according to conditions that are set by a user;

FIG. 5A is a diagram illustrating an example of a transcoding schedule setting screen; and FIGS. 5B, 5C are diagrams each illustrating an example of a warning screen used in a case where a period of time during which transcoding is performed overlaps a period of time during which recording is performed;

FIG. 6 is a flowchart illustrating the entire flow of transcoding processing;

FIG. 7 is a flowchart illustrating a process of selecting a target broadcast program to be transcoded;

FIG. 8 is a flowchart illustrating a process of selecting a time zone in which transcoding is executed;

FIG. 9 is another flowchart illustrating a process of selecting a time zone in which transcoding is executed;

DETAILED DESCRIPTION OF THE PREFERRED EMBODIMENTS

Preferred embodiments of the present invention will be described with reference to drawings as below. The present embodiment will be described by taking as an example a case where a hard disk medium is used, and a video signal compressed based on the MPEG2 method is transcoded to generate a video signal compressed based on the H.264 method. However, the present invention is not limited to this.

Figure 1:
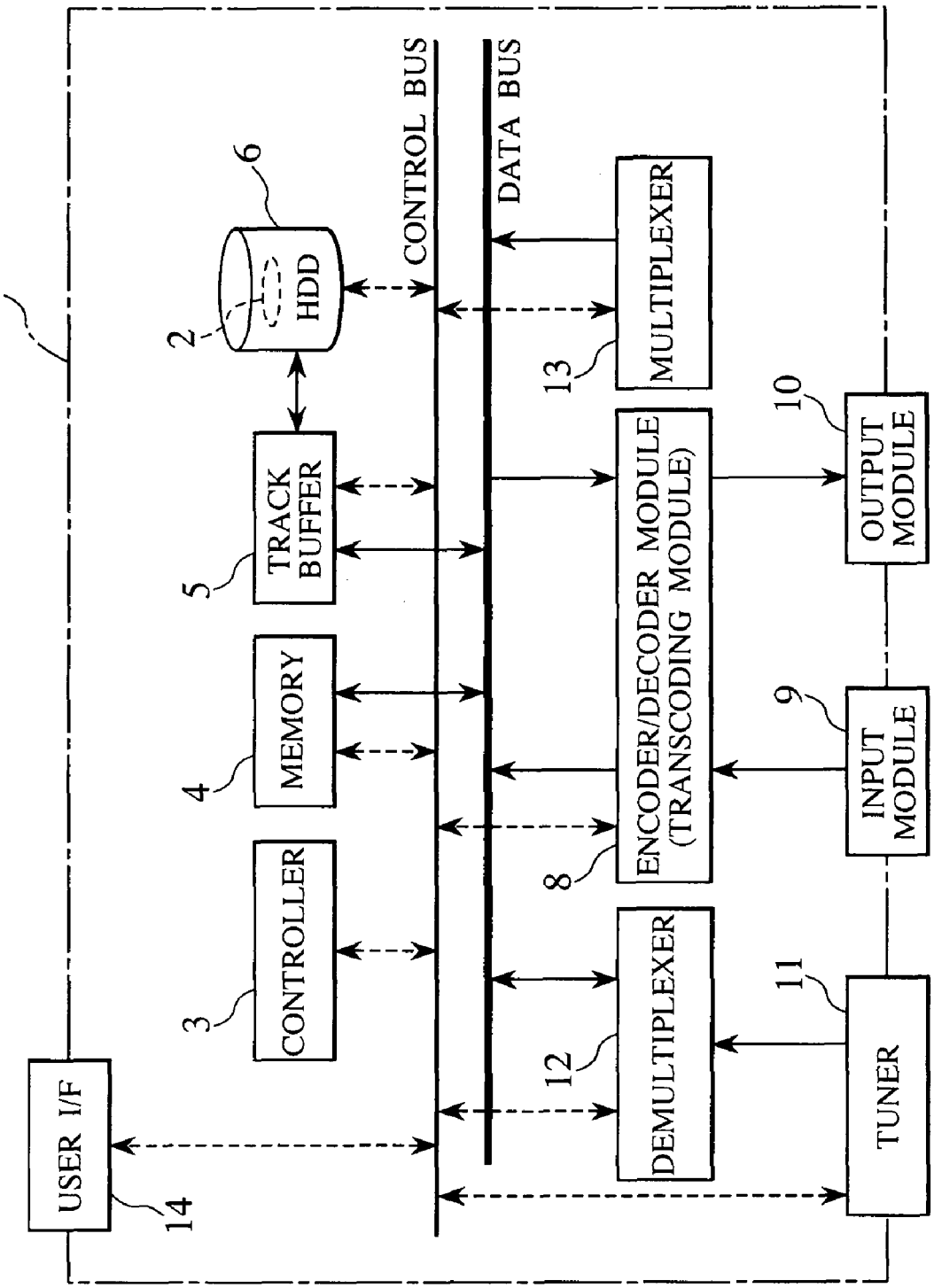
FIG. 1 is a block diagram illustrating one embodiment of a data recording and reproducing apparatus according to the present invention.

FIG. 1 is a block diagram illustrating one embodiment of a data recording and reproducing apparatus according to the present invention. A data recording and reproducing apparatus 1 records, to a recording medium 2, video and audio signals acquired as a result of receiving a digital broadcast, or video and audio signals inputted from an external device such as a camera, based on a specified compression encoding method. In addition, the data recording and reproducing apparatus 1 reproduces video and audio signals from the recording medium 2, and then outputs the signals as signals based on the specified compression method.

For example, the recording medium 2 is a hard disk. A video signal is recorded to the recording medium 2 in MPEG2 or H.264 method. A controller 3 controls the data recording and reproducing apparatus 1 as a whole. More specifically, the controller controls settings of an encoder/decoder module 8, and also controls reading/writing (R/W) of data from/to a hard disk drive (HDD) 6. A memory 4 is a flash memory for storing information about recording schedule set by a user, and the like. A track buffer 5 is a buffer memory used to read/write data from/to the hard disk drive (HDD) 6, and is constituted of a large capacity memory such as a SDRAM. The HDD 6 drives the hard disk medium 2 to write/read data by use of a magnetic head (not illustrated).

The encoder/decoder (transcoding) module 8 compresses and encodes video and audio signals inputted from the outside, and also decompresses and decodes a signal reproduced from the medium 2. Moreover, the encoder/decoder (transcoding) module 8 has a function of transcoding video and audio signals received from a digital broadcast, and data reproduced from the medium 2, to signals based on a different compression method. An input module 9 inputs analog video and audio signals received from the outside of the apparatus 1. An output module 10 outputs analog video and audio signals to the outside of the apparatus 1. A tuner 11 receives a digital broadcast, and inputs a video-audio multiplexed signal (hereinafter referred to as a "stream signal") into the apparatus 1. A demultiplexer 12 demultiplexes a stream signal received from the tuner 11, or a stream signal reproduced from the medium 2, into a video signal and an audio signal. A multiplexer 13 multiplexes a video signal and an audio signal to generate a stream signal. A user interface (I/F) 14 includes operation buttons which a user operates, a FL display tube, and a remote-control light receiving module. The user IF receives a recording/reproducing instruction (including scheduling) from a user, and displays notification information for the user.

First of all, transcoding processing of transcoding video and audio signals based on a compression encoding method in an apparatus according to this embodiment will be outlined (hereinafter the compression encoding method is also merely referred to as a "method").

A user uses the user IF 14 of the apparatus according to the present embodiment to perform operation including scheduling for a broadcast program. Then, received information about the recording schedule is stored in the memory 4. A digital broadcast signal which has been received by the tuner 11 is demultiplexed into a video signal (based on the MPEG2 method) and an audio signal (based on the AAC method) by the demultiplexer 12. The controller 3 refers to the memory 4, and thereby extracts a broadcast program for which recording is scheduled. The extracted broadcast program is multiplexed by the multiplexer 13. The multiplexed broadcast program is then temporarily recorded to the medium 2 through the track buffer 5 and the HDD 6. As a result, several recorded broadcast programs are stored in the medium 2 with a method used at the time of receiving each broadcast program, the method being kept unchanged. In addition, the user can set the priority order of transcoding to each recorded broadcast program so that priority information is stored in the memory 4 on a broadcast program basis. The controller 3 refers to the memory 4 to make a transcoding schedule, and then stores the transcoding schedule in the memory 4. To be more specific, the controller 3 checks the unused time in which recording is not scheduled (including scheduling of transcoding), and then executes transcoding with the higher priority being given to the broadcast program specified by the user. Since this processing is executed in the background, it is not necessary for the user to be conscious of the processing.

The transcoding processing is performed as described below. First of all, a stream signal of a target broadcast program is reproduced from the medium 2. The stream signal is then demultiplexed into a video signal and an audio signal. The transcoding module 8 transcodes the video signal to that based on a different method (for example, the H.264 method), and also transcodes the audio signal to that based on a different method (for example, the AC3 method). The transcoded video and audio signals are multiplexed by the multiplexer 13. The multiplexed signal is then recorded to the medium 2 again. After that, the stream signal of the broadcast program in question, which is stored up to the present, is erased from the medium 2. If the transcoding processing is performed in this way, the signals can be transcoded to those based on the H.264 method whose image quality is similar to that of the MPEG2, and whose compression ratio is twice or three times higher than that of the MPEG2. As a result, the efficiency in the use of the medium is improved to a large extent. In addition, there is no possibility that a plurality of identical contents will remain on the medium. This makes it possible to observe Copyright Law. Incidentally, even if the audio signal based on the AAC method is not transcoded, the effect of saving the capacity of the medium can be produced.

Figure 2:
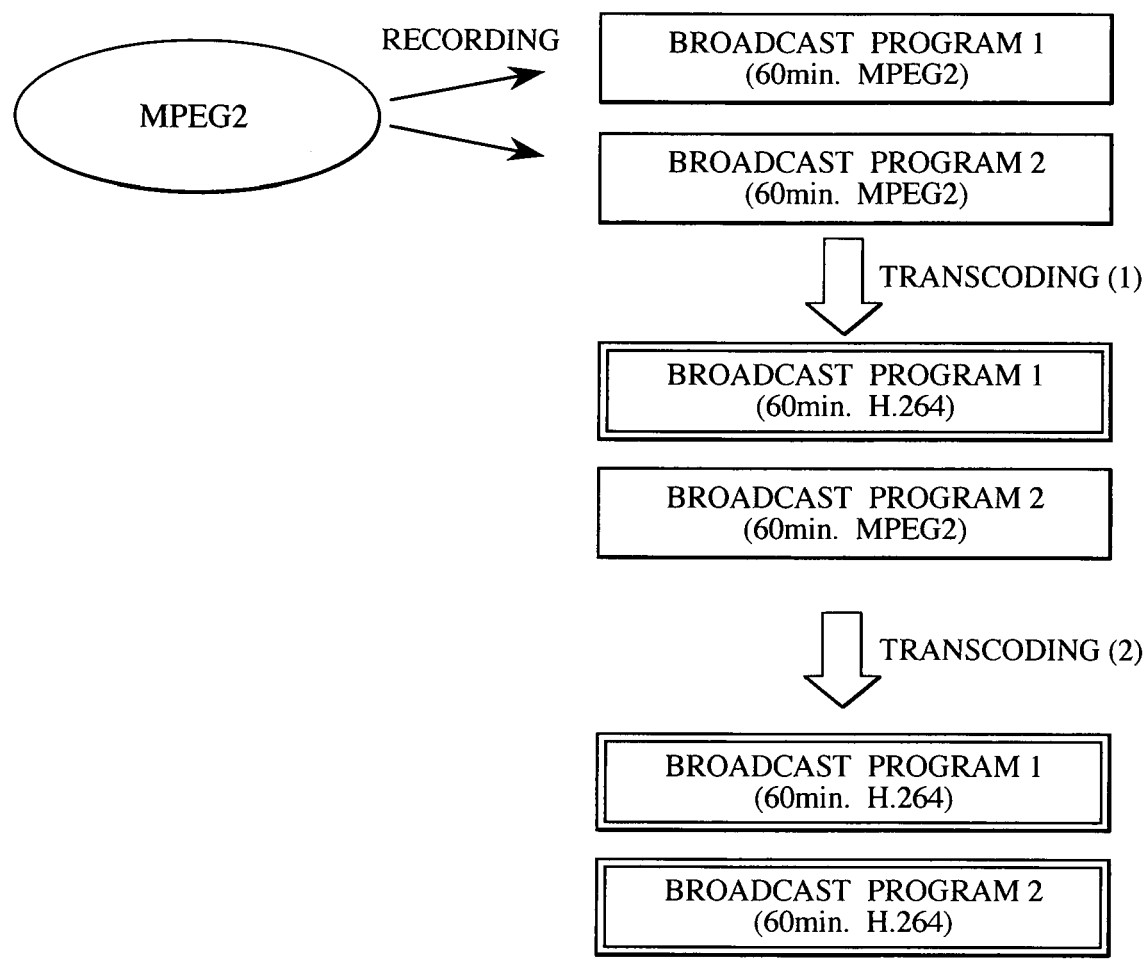
FIG. 2 is a diagram schematically illustrating processing of transcoding a plurality of broadcast programs.

FIG. 2 is a diagram schematically illustrating processing of transcoding a plurality of broadcast programs. For example, two received broadcast programs 1, 2 are concurrently recorded in the method (MPEG2) that is used at the time of receiving the broadcast programs 1, 2. Next, using the unused time, the broadcast program 1 to which a user gives higher priority is transcoded to that based on a different method (H.264) (transcoding (1)). Further, using the unused time, the broadcast program 2 is transcoded to that based on a different method (transcoding (2)). Thus, even if a recording time zone of one broadcast program overlaps that of the other broadcast program, these broadcast programs can be transcoded to those based on the method (H.264) whose compression ratio is high before the broadcast programs are stored.

Figure 3:
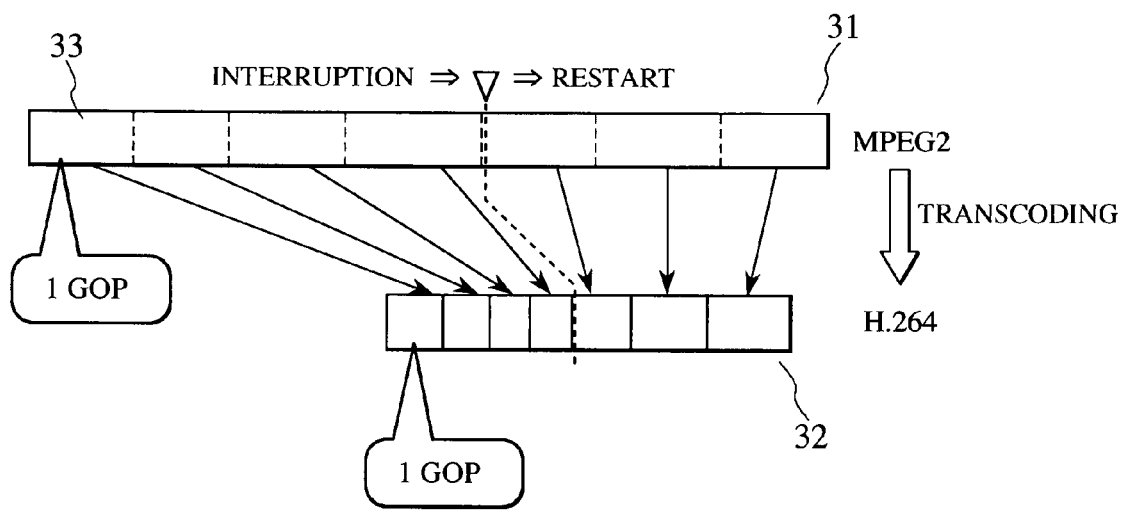
FIG. 3 is a diagram schematically illustrating a configuration of data processed in transcoding processing.

FIG. 3 is a diagram schematically illustrating a configuration of data processed in transcoding processing. Here, a case where a video signal 31 based on the MPEG2 method is transcoded to a video signal 32 based on the H.264 method will be described. The transcoding processing is repeated on a GOP (Group Of Picture) (reference numeral 33) basis. If the transcoding processing is performed in this manner, the video signal does not fluctuate even if the transcoding processing is interrupted in midstream with the result that the transcoding processing is restarted from a point of time at which the interruption has occurred. In addition, for content whose copyright must be protected (copyright restrictions), the content is restricted by regulations concerning "move" of content. To be more specific, a period of time during which source content to be transcoded and target content created as a result of the transcoding coexist in a duplicated manner is limited to, for example, one minute at the maximum. Therefore, the source content for which transcoding has been completed must be successively erased so that the period of time during which both of them coexist does not exceed one minute. By performing the transcoding and erasure on a GOP basis, it is possible to satisfy the regulations concerning "move" of content.

Thus, in this embodiment, there is no possibility that a plurality of identical contents will remain on the medium. This makes it possible to observe Copyright Law. In addition, it is possible to save the capacity of the medium, and thereby to efficiently store the content.

Next, schedule settings of transcoding according to this embodiment will be specifically described. FIGS. 4A through 4D are lists each illustrating an example in which each transcoding schedule is determined according to conditions that are set by a user.

FIG. 4A is a list showing broadcast programs for which a recording is scheduled by a user, the broadcast programs being shown in order of scheduling. The user selects a broadcast program from an EPG screen, and schedules recording thereof. In this case, when the user specifies a bit rate, a menu which allows the user to select whether or not "H.264 transcoding" is required, and to select between "the high priority/the low priority", is displayed so that the user can make the selections. It is to be noted that the priority can also be set after each broadcast program is recorded.

FIG. 4B is a list showing broadcast programs to be transcoded, the broadcast programs being shown in order of decreasing priority according to setting conditions of the user in FIG. 4A. Here, the broadcast program No. 2 has the highest priority.

FIG. 4C is a list showing the unused time of a data recording and reproducing apparatus, and illustrates time zones, each of which is not used for the recording schedule shown in FIG. 4A.

FIG. 4D is a list showing transcoding schedules, which are determined on the basis of the conditions shown in FIGS. 4B, 4C. In this case, it is desirable that the transcoding schedules be determined by comparing the time length of the broadcast program to be transcoded with the length of the unused time so that the transcoding processing is not interrupted in midstream.

Moreover, even in the case of a time zone in which recording is not scheduled, a schedule is made by avoiding a time zone in which there is a high possibility that the user will schedule a recording in future. To be more specific, schedules are made as follows: searching for a current status of the recording schedule, and history information of broadcast programs viewed in the past, to keep track of the tendency of user's taste (favorite genre, and the like); extracting broadcast programs, each of which has a possibility of being recorded in future; and making schedules so that transcoding processing is executed with time zones corresponding to the extracted broadcast programs being avoided. This will be described in detail later.

The controller 3 of the data recording and reproducing apparatus reads out setting information input by the user, and history records of recording information of the past, from the memory 4. On the basis of the setting information and the history records, the above-described schedules are automatically determined. Here, only the broadcast-program recording schedule screen shown in FIG. 4A is presented to the user. The transcoding schedules shown in FIGS. 4B through 4D are not particularly displayed, and are processed in the background. However, it is also possible to display FIGS. 4B through 4D upon request by the user.

On the other hand, the user can also set the above-described transcoding schedules. FIGS. 5A, 5B, 5C are diagrams each illustrating processing performed in a case where as a result of setting transcoding schedules by a user, a period of time during which transcoding is performed overlaps a period of time during which recording is performed.

More specifically, FIG. 5A is a diagram illustrating an example of a screen used for recording schedule and scheduled transcoding. The screen displays a state in which the user has scheduled recording of broadcast programs 1 through 3. Referring to the screen, the user finds out the unused time to schedule transcoding of the broadcast programs whose recording has already been scheduled. Here, the user schedules transcoding of the broadcast programs 1, 3.

FIGS. 5B, 5C illustrate examples of warning screens, each of which is displayed when recording scheduled by the user starts during transcoding. These warning screens are also displayed in the same manner in a case where after transcoding is scheduled, the scheduled transcoding overlaps recording of the broadcast programs scheduled by the user. FIG. 5B illustrates a screen that displays a warning massage notifying the user of the overlapping, and that prompts the user to select transcoding or recording to which the user gives higher priority. On the other hand, FIG. 5C illustrates a screen that displays a warning massage notifying the user of the overlapping, and also notifying that transcoding will be interrupted because higher priority is given to recording and accordingly processing is automatically switched from transcoding to recording. In this case, the remaining portion of the interrupted transcoding of the broadcast program can also be scheduled again by use of another time zone. As a matter of course, as opposed to FIG. 5C, it is also possible to automatically give higher priority to transcoding to continue the transcoding with the warning message being displayed.

Next, a method for automatically setting an efficient transcoding schedule, which suits user's taste, will be described. Algorithm (setting conditions) which is effective for this method will be described as below. First of all, algorithm of how to select a broadcast program to be transcoded includes (#1) through (#3):

(#1) If there is a broadcast program for which transcoding has been previously interrupted, a higher priority is given to this broadcast program;

(#2) If a user has a specified priority of transcoding on a broadcast program basis, a selection is made according to the specified priority; and (#3) Based on a transcoding history (log) of the past, a broadcast program or a genre to which the broadcast program belongs, whose frequency of transcoding is high, is searched to give a higher priority to the frequently transcoded broadcast program.

Next, algorithm of how to select a time zone in which transcoding is performed includes (#4) through (#6):

(#4) On the basis of a broadcast-program recording history (log) of the past, a time zone in which the frequency of recording is high is selected from among unused time zones in which recording is not scheduled to avoid the selected time zone;

(#5) Based on history records of keywords used for keyword automatic recording carried out in the past (the keyword automatic recording is a function of, if "soccer" is registered, searching EPG or the like, to record all broadcast programs relating to soccer), frequently used keywords are searched to avoid a time zone in which recording of a broadcast program including the keyword is scheduled; and (#6) In order to utilize the night (midnight) electric power whose electric power charge is low, transcoding is performed in a night (midnight) time zone.

FIGS. 6 through 9 are examples of flowcharts in which a transcoding schedule is made and executed according to the above-described algorithms.

FIG. 6 is a flowchart illustrating the flow of transcoding processing as a whole. Upon receipt of an instruction to start transcoding, a judgment is made as to whether or not there is a broadcast program for which transcoding has been previously interrupted in midstream (S102). If it is judged that there is a broadcast program that meets the above condition, transcoding is executed with higher priority being given to the broadcast program (algorithm #1). In this case, as described in FIG. 3, restarting the transcoding on a GOP basis causes no problem. In addition, a judgment is made as to whether or not there is programmed transcoding set by a user (S103). If it is judged that there is scheduled transcoding set by the user, transcoding is executed according to the schedule.

Next, a data recording and reproducing apparatus automatically sets transcoding schedules. First of all, a target broadcast program to be transcoded is selected (S104). Then, a time zone in which transcoding is executed is selected (S105). These selections will be described in detail with reference to FIGS. 7 through 9. The selected broadcast program is combined with the selected time zone to make a schedule, and then transcoding is executed (S106). During the transcoding, if a recording operation by the user causes the transcoding to be interrupted (S107), the transcoding processing ends (S108).

FIG. 7 is a flowchart illustrating in detail a process (S104) of selecting a target broadcast program to be transcoded. First of all, a judgment is made as to whether or not the priority of transcoding has been given to a recorded broadcast program by a user (S202). If it is judged that the priority of transcoding has been given to the recorded broadcast program by the user, a broadcast program having higher priority is selected according to the result of the judgment (S203) (algorithm #2). If it is judged that the priority of transcoding has not been given to the recorded broadcast program by the user, transcoding history records of the past are referred to. Then, a broadcast program whose frequency of transcoding is high is extracted from among transcoded broadcast programs (S204). If a broadcast program which coincides with the extracted broadcast program exists, this broadcast program is selected as a target broadcast program (S206) (algorithm #3). Moreover, by referring to the transcoding history records of the past, a genre of the transcoded broadcast program is checked to extract a genre whose frequency of transcoding is high (S207). Then, if a broadcast program which belongs to the extracted genre exists, this broadcast program is selected as a target broadcast program (S209) (algorithm #3). If a target broadcast program cannot be selected as a result of the processing described above, a broadcast program whose recorded date and time is the oldest is selected (S210).

FIG. 8 is a flowchart illustrating in detail a process of selecting a time zone in which transcoding is executed (S105). First of all, a time zone (T1) in which both recording and transcoding are not scheduled is extracted (S302). A judgment is made as to whether or not the extracted time zone T1 is sufficient for the length of time required to transcode the target broadcast program which has been selected in S104 (S303). If it is judged that the time zone T1 is not sufficient for the transcoding (including lack of time), the extracted time zone T1 is selected (S304). If it is judged that the time zone T1 is sufficient for the transcoding, history records of recording information of the past are referred to. Then, a broadcast program whose frequency of recording is high is selected from among broadcast programs recorded in the past, and the time zone (T2) thereof is extracted (algorithm #4). In addition, if keyword automatic recording has been performed in the past, a broadcast program which includes frequently used keywords is selected, and the time zone (T2) thereof is extracted (algorithm #5). After that, this extracted time zone (T2) is subtracted from the above-described time zone (T1) (S305). A judgment is made as to whether or not the time zone (T1-T2) acquired as a result of the subtraction is sufficient for the length of time required to transcode the target broadcast program (S306). If it is judged that the time zone (T1-T2) is not sufficient for the transcoding, the time zone (T1-T2) acquired as a result of the subtraction is selected (S307). If it is judged that the time zone (T1-T2) is sufficient for the transcoding, a time zone (T3) which is a night (midnight) time zone is extracted from the time zone (T1-T2) (S308) (algorithm #6), and this time zone (T3) is selected (S309). Then, a judgment is made as to whether or not the selected time zone described above is sufficient for the length of time required to transcode the target broadcast program (S310). If it is judged that the selected time zone is sufficient for the transcoding, the execution of the transcoding is assigned to the selected time zone. If it is judged that the selected time zone is not sufficient for the transcoding (in the case of lack of time), the process returns to the step S302. Then, a time zone to be added is selected, and the execution of the transcoding is also assigned to this time zone. In this case, the transcoding will be interrupted in the middle of a broadcast program.

In addition, FIG. 9 is a flowchart illustrating another example of a process of selecting a time zone in which transcoding is executed (S105). The steps shown in FIG. 8 are based on the principles that even in the case of the short time, transcoding is executed. On the other hand, steps shown in FIG. 9 are based on the principles that transcoding is executed after the sufficient length of time is acquired. This makes it possible to reduce risks including abnormal data caused by the interruption of transcoding. First of all, a time zone (T1) in which both recording and transcoding are not scheduled is extracted (S402). A judgment is made as to whether or not the extracted time zone T1 is sufficient for the length of time required to transcode the target broadcast program which has been selected in S104 (S403). If it is judged that the time zone T1 is not sufficient for the transcoding (including lack of time), it is judged that it is impossible to execute the transcoding (S404). Accordingly, the process ends without executing the transcoding. If it is judged that the time zone T1 is sufficient for the transcoding, history records of recording information of the past are referred to. Then, a broadcast program whose frequency of recording is high is selected from among broadcast programs recorded in the past, and the time zone (T2) thereof is extracted (algorithm #4). In addition, if keyword automatic recording has been performed in the past, a broadcast program which includes frequently used keywords is selected, and the time zone (T2) thereof is extracted (algorithm #5). After that, this extracted time zone (T2) is subtracted from the above-described time zone (T1) (S405). A judgment is made as to whether or not the time zone (T1-T2) acquired as a result of the subtraction is sufficient for the time required to transcode the target broadcast program (S406). If it is judged that the time zone (T1-T2) is not sufficient for the transcoding, the time zone Ti is selected (S407). If it is judged that the time zone (T1-T2) is sufficient for the transcoding, a time zone (T3) which is a night (midnight) time zone is extracted from the time zone (T1-T2) (S408) (algorithm #6). Then, a judgment is made as to whether or not the extracted time zone (T3) described above is sufficient for the length of time required to transcode the target broadcast program (S409). If it is judged that the extracted time zone (T3) is sufficient for the transcoding, the execution of the transcoding is assigned to the extracted time zone (T3) (S410). If it is judged that the extracted time zone (T3) is not sufficient for the transcoding (in the case of lack of time), the time zone (T1-T2) acquired as a result of the subtraction is selected, and the execution of the transcoding is assigned to this time zone (S411). This makes it possible to extract a time zone in which transcoding can be reliably executed. Therefore, this produces an effect of decreasing a possibility that transcoding will be interrupted in the middle of a broadcast program.

In this embodiment, when a transcoding schedule is set, a recorded broadcast program is not merely assigned to the unused time of the data recording and reproducing apparatus so as to execute transcoding, but a user's recording history of the past or the like is referred to so that a schedule is determined based on the priority. Therefore, it is possible to achieve satisfactory transcoding on which user's taste and the like are reflected. In addition, by executing transcoding in a night time zone, an effect of reducing an electric power charge is also achieved. Moreover, because the processing is executed in the background without causing the user to be conscious of the processing, no load is placed on the user.

In the embodiments described above, a hard disk is used as a recording medium. However, the recording medium is not limited to this. Accordingly, even a rewritable optical disc (in particular, a large-capacity BD) can also be used in like manner. In addition, a plurality of media including a hard disk and an optical disc can also be used in combination.

Figure 10:
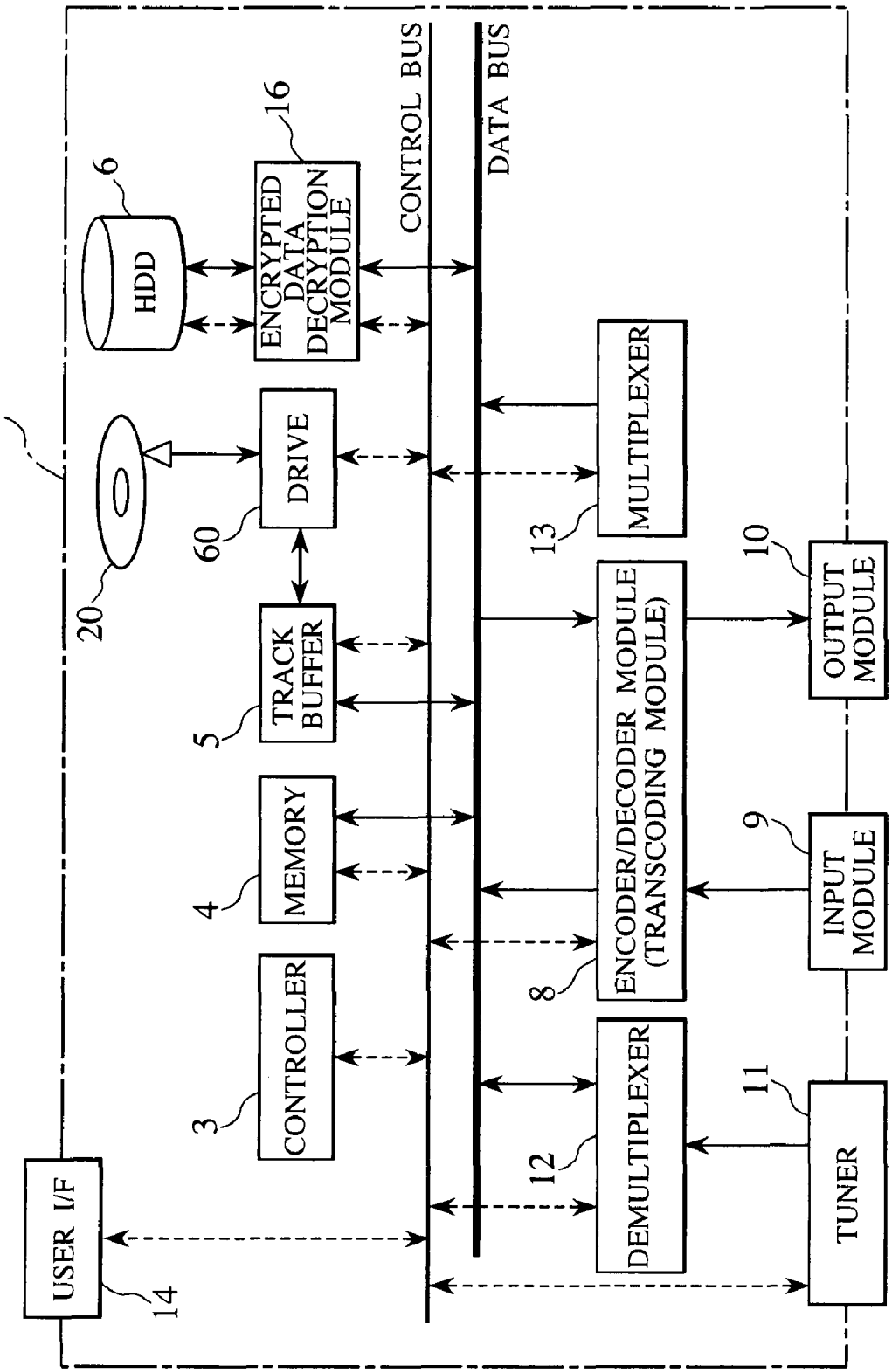
FIG. 10 is a block diagram illustrating another embodiment of a data recording and reproducing apparatus according to the present invention.

For example, as shown in FIG. 10, a data recording and reproducing apparatus in which an optical disc (BD) medium 20 is also used in combination is capable of recording with the BD medium being used in cooperation with a HDD medium. In this case, efficient processing can be achieved by: temporarily storing a signal before transcoding in, for example, a HDD 6; and then transcoding this signal before the transcoded signal is stored in the BD medium 20 through a drive 60. Incidentally, when recording to a HDD medium is performed, processing for copyright protection is required. Therefore, in this case, the data recording and reproducing apparatus is configured to perform recording and reproduction through an encrypted data decryption module 16.

Figure 11:
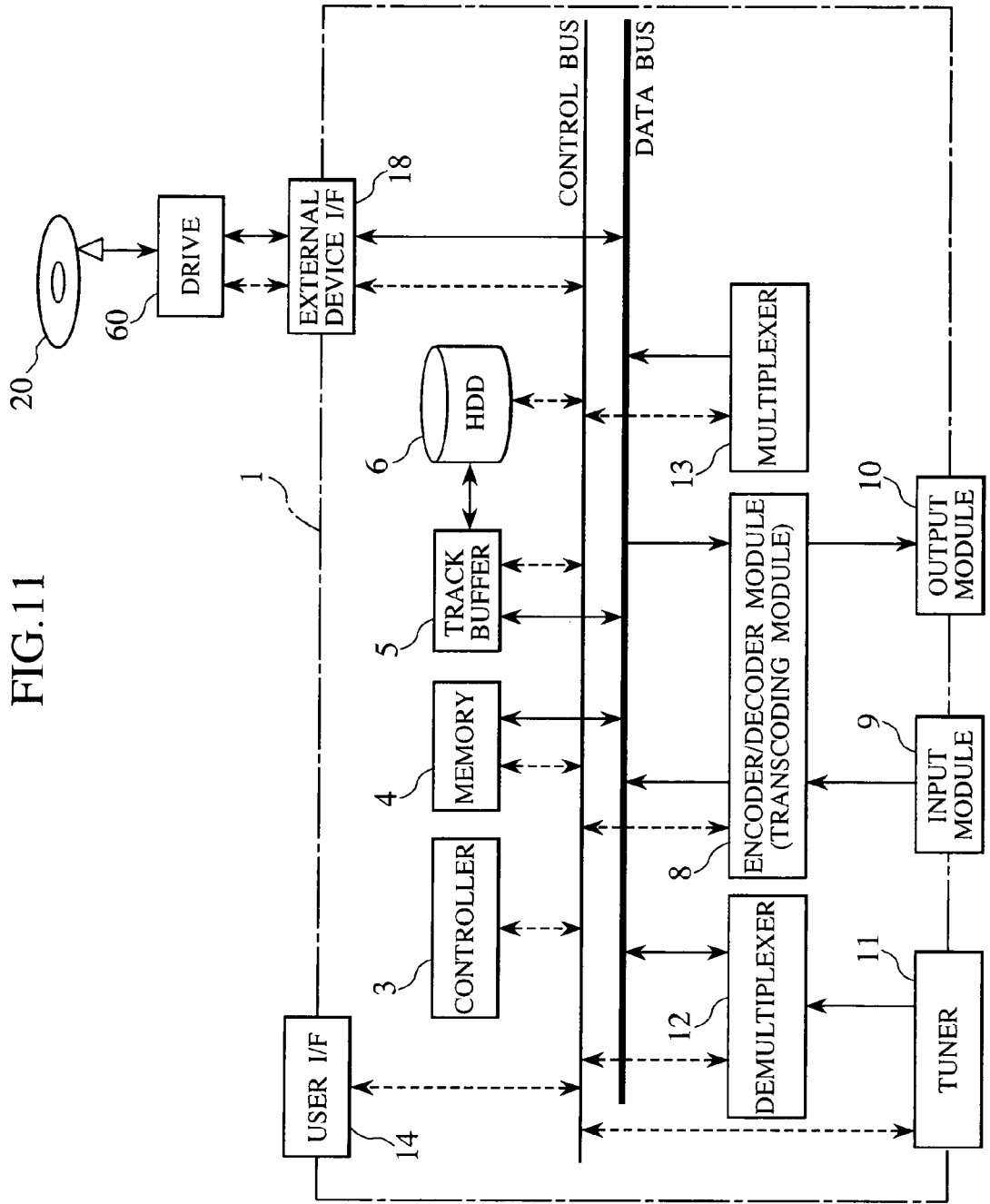
FIG. 11 is a block diagram illustrating still another embodiment of a data recording and reproducing apparatus according to the present invention.

Moreover, as shown in FIG. 11, the data recording and reproducing apparatus includes an external device I/F 18. Accordingly, the data recording and reproducing apparatus is capable of performing recording/reproduction to/from the outside storage device having, for example, an USB (Universal Serial Bus) connection. Not only the BD medium 20 that is an optical disc storage device, but also a SD card and a flash memory, which are semiconductor storage devices, and a HDD medium, can also be used as the outside storage device. Therefore, recording can be carried out in cooperation with these storage devices. Further, even if other HDD recorders, and recording media such as a HDD that is built into a HDD video camera, are identified as outside storage devices, it is possible to handle them in like manner.

An example of transcoding, the above embodiments described a case where a video signal based on the MPEG2 method is transcoded to a video signal based on the H.264 method. However, the compression method is not limited to them. In addition, it is needless to say that, by transcoding an audio signal to provide an audio signal based on a high compression method, it is possible to increase an effect of saving the medium capacity.

Figure 12:
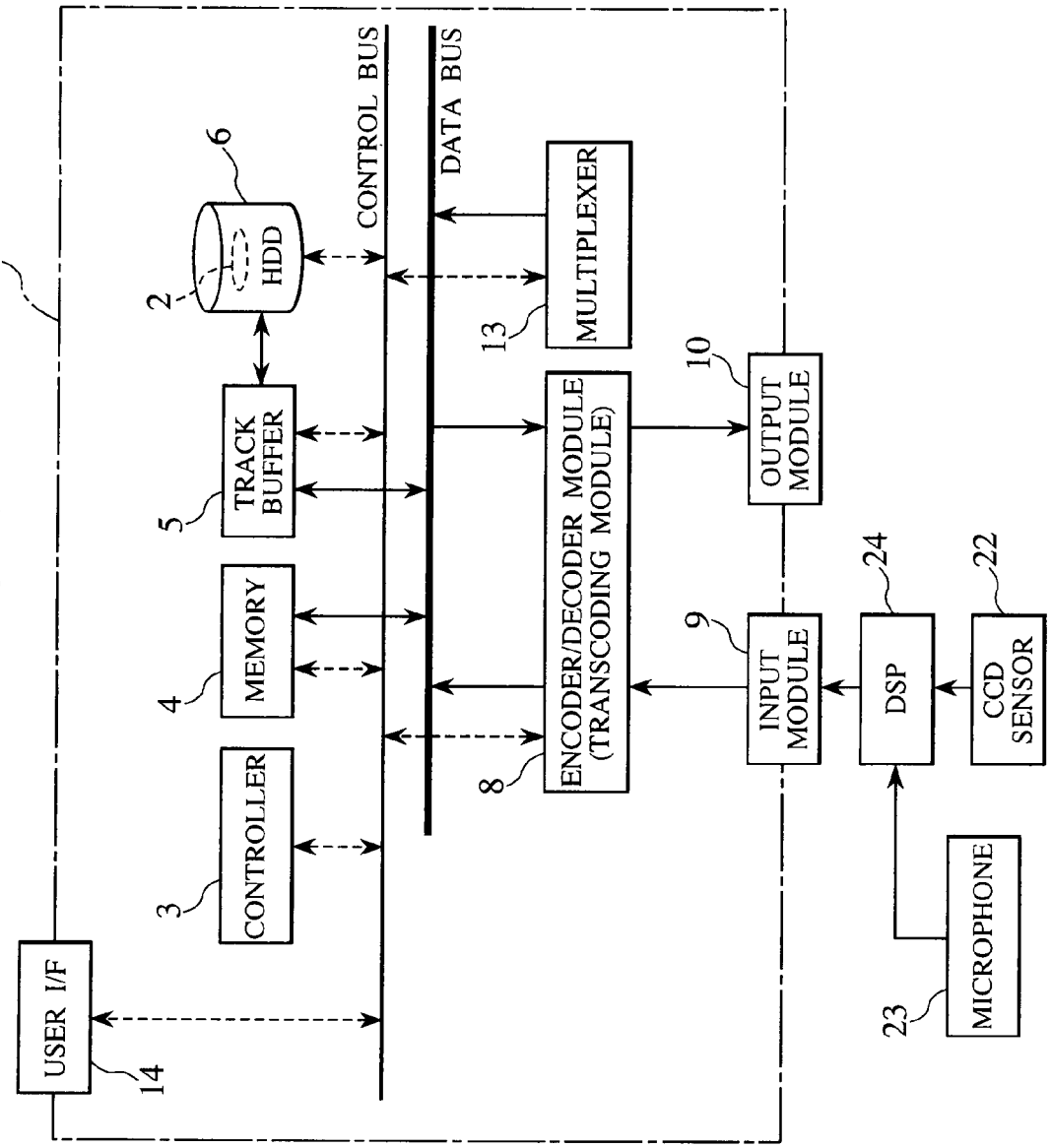
FIG. 12 is a block diagram illustrating a further embodiment of a data recording and reproducing apparatus according to the present invention.

Moreover, the above embodiments described a case where a stream signal is inputted from a digital broadcast. However, the input signal source is not particularly limited. For example, as shown in FIG. 12, even if a video signal received by an CCD (Charge-Coupled Device) sensor 22 of a camera, and an audio signal collected by a microphone 23 of the camera, are inputted through a DSP (Digital Signal Processor) 24 so that the video and audio signals are encoded by a specified compression method before the encoded video and audio signals are written to a medium, the present invention can be applied to this case in like manner.

Figure 13:
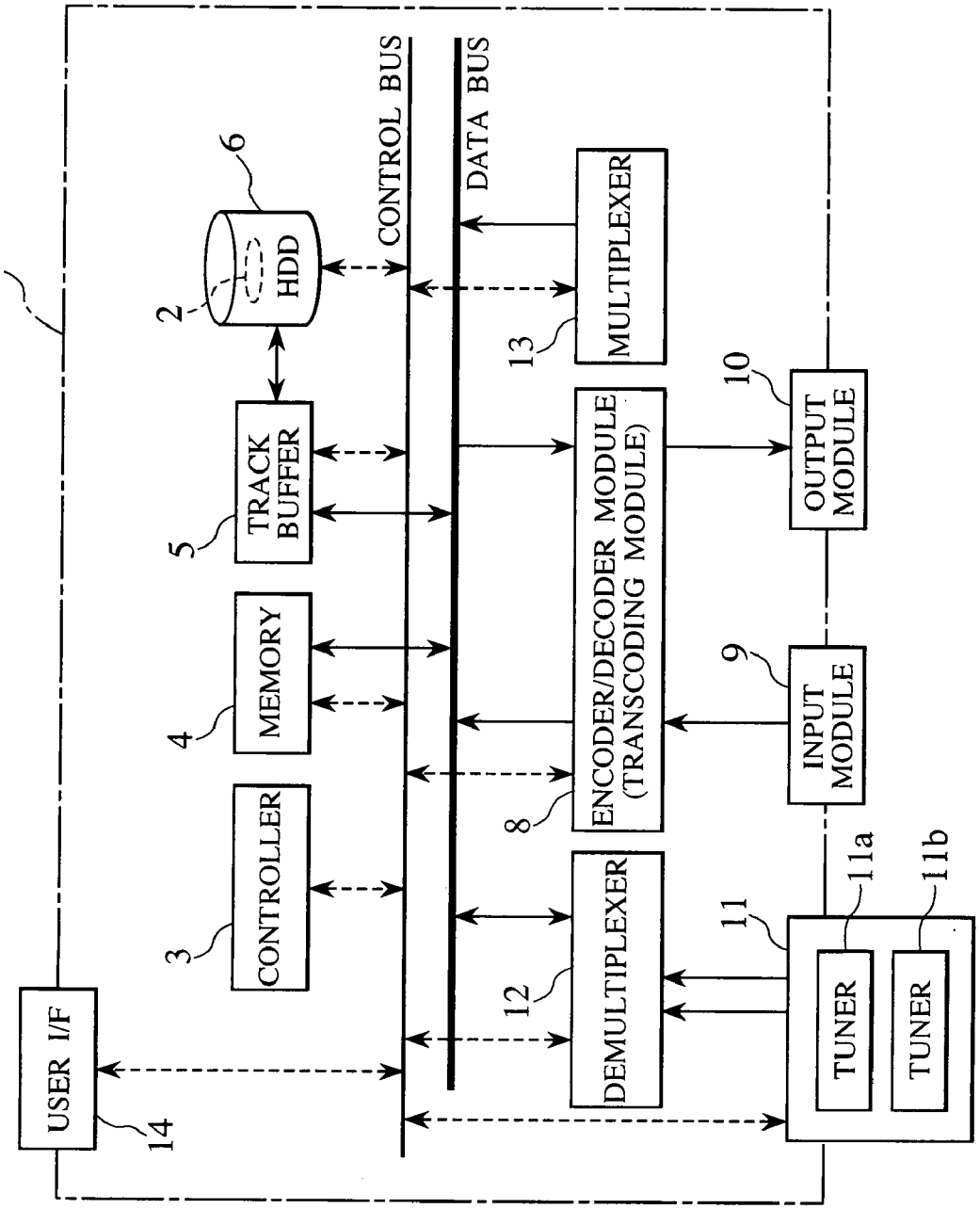
FIG. 13 is a block diagram illustrating still a further embodiment of a data recording and reproducing apparatus according to the present invention.

Furthermore, in the embodiments described above, the data recording and reproducing apparatus is configured to be equipped with only one set of digital tuner. However, the number of input signal sources is not particularly limited. For example, as shown in FIG. 13, even if the data recording and reproducing apparatus is configured to be equipped with two sets of digital tuners 11a, 11b, the present invention can also be applied to this case in like manner by handling, in a time-sharing manner, each digital broadcast that is received by each of the two sets of digital tuners 11a, 11b. Even if the data recording and reproducing apparatus is configured to be equipped with tree sets of digital tuners or more, each digital broadcast is handled in like manner.

As described above, according to the present invention, it is possible to automatically perform transcoding processing so as to suit user's taste.

While we have shown and described several embodiments in accordance with our invention, it should be understood that disclosed embodiments are susceptible to changes and modifications without departing from the scope of the invention. Therefore, we do not intend to bound by the details shown and described herein but intend to cover all such changes and modifications as fall within the ambit of the appended claims.

What is claimed is:

1. A data recording and reproducing apparatus which records and reproduces a video signal or an audio signal to and from a recording medium, the data recording and reproducing apparatus comprising:
   a transcoding module which transcodes a video signal or an audio signal, which has been recorded on the recording medium, to a video signal or an audio signal that is compressed by another compression method; and
   a control module which controls the transcoding processing of the transcoding module, wherein:
   the control module extracts a time zone (T1) in which both recording and transcoding are not scheduled, and selects the time zone (T1) as a first candidate of a time zone in which the transcoding processing is to be executed;
   the control module extracts a time zone (T2) in which a broadcast program whose frequency of recording is high is searched from among broadcast programs recorded in the past, or in which, if keyword automatic recording has been performed in the past, a broadcast program which includes frequently used keywords is searched, and selects the time zone (T1-T2) in which the extracted time zone (T2) is subtracted from the time zone (T1) as a second candidate of the time zone in which the transcoding processing is to be executed; and
   the control module assigns the execution of the transcoding to the combination of the first and second candidates of the time zone, so that the assigned time zone is sufficient for the length of time required to transcode the target broadcast program.

2. A data recording and reproducing apparatus which records and reproduces a video signal or an audio signal to and from a recording medium, the data recording and reproducing apparatus comprising:
   a transcoding module which transcodes a video signal or an audio signal, which has been recorded on the recording medium, to a video signal or an audio signal that is compressed by another compression method; and
   a control module which controls the transcoding processing of the transcoding module, wherein:
   the control module extracts a time zone (T1) in which both recording and transcoding are not scheduled, and selects the time zone (T1) as a first candidate of a time zone in which the transcoding processing is to be executed;
   the control module extracts a time zone (T3) which is a night time zone within the time zone (T1), and selects the time zone (T3) as a third candidate of the time zone in which the transcoding processing is to be executed; and
   the control module assigns the execution of the transcoding to the combination of the first and the third candidates of the time zone, so that the assigned time zone is sufficient for the length of time required to transcode the target broadcast program.

3. A data recording and reproducing method for recording and reproducing a video signal or an audio signal to and from a recording medium, the data recording and reproducing method comprising steps of:
   recording a video signal or an audio signal to the recording medium, and
   transcoding a video signal or a audio signal, which has been recorded on the recording medium, to a video signal or a audio signal that is compressed by another compression method, wherein the transcoding step including steps of:
   extracting a time zone (T1) in which both recording and transcoding are not scheduled, and selecting the time zone (T1) as a first candidate of a time zone in which the transcoding processing is to be executed,
   extracting a time zone (T2) in which a broadcast program whose frequency of recording is high is searched from among broadcast programs recorded in the past, or in which, if keyword automatic recording has been performed in the past, a broadcast program which includes frequently used keywords is searched, and selecting the time zone (T1-T2) in which the extracted time zone (T2) is subtracted from the time zone (T1) as a second candidate of the time zone in which the transcoding processing is to be executed; and
   assigning the execution of the transcoding to the combination of the first and the second candidates of the time zone, so that the assigned time zone is sufficient for the length of time required to transcode the target broadcast program.

4. A data recording and reproducing method for recording and reproducing a video signal or an audio signal to and from a recording medium, the data recording and reproducing method comprising steps of:
   recording a video signal or an audio signal to the recording medium, and
   transcoding a video signal or a audio signal, which has been recorded on the recording medium, to a video signal or a audio signal that is compressed by another compression method, wherein the transcoding step including steps of:
   extracting a time zone (T1) in which both recording and transcoding are not scheduled, and selecting the time zone (T1) as a first candidate of a time zone in which the transcoding processing is to be executed;
   extracting a time zone (T3) which is a night time zone within the time zone (T1), and selecting the time zone (T3) as a third candidate of the time zone in which the transcoding processing is to be executed; and
   assigning the execution of the transcoding to the combination of the first and the third candidates of the time zone, so that the assigned time zone is sufficient for the length of time required to transcode the target broadcast program.

* * * * *